US012781822B2

(12) United States Patent
Furtado et al.

(10) Patent No.: US 12,781,822 B2
(45) Date of Patent: Nov. 3, 2026

(54) NOISE-REDUCING ELEMENT FOR A LEAF SPRING

(71) Applicant: RASSINI—NHK AUTOPEÇAS LTDA., São Bernardo do Campo—SP (BR)

(72) Inventors: Danilo Furtado, São Bernardo do Campo—SP (BR); Marcos Dos Santos, São Paulo—SP (BR); Ricardo Guedes Manini, São Bernardo do Campo—SP (BR)

(73) Assignee: RASSINI—NHK AUTOPEÇAS LTDA., São Bernardo do Campo—SP (BR)

( * ) Notice: Subject to any disclaimer, the term of this patent is extended or adjusted under 35 U.S.C. 154(b) by 481 days.

(21) Appl. No.: 17/439,271

(22) PCT Filed: Mar. 13, 2020

(86) PCT No.: PCT/BR2020/050088
§ 371 (c)(1),
(2) Date: Sep. 14, 2021

(87) PCT Pub. No.: WO2020/181351
PCT Pub. Date: Sep. 17, 2020

(65) Prior Publication Data

US 2022/0196101 A1 Jun. 23, 2022

(30) Foreign Application Priority Data

Mar. 14, 2019 (BR) .......................... 2020190049796

(51) Int. Cl.
*F16F 1/20* (2006.01)
*B60G 99/00* (2010.01)
*B60G 11/02* (2006.01)

(52) U.S. Cl.
CPC .............. *F16F 1/20* (2013.01); *B60G 99/002* (2013.01); *B60G 11/02* (2013.01); (Continued)

(58) Field of Classification Search
CPC ............................. B60G 2600/44; F16F 1/182
See application file for complete search history.

(56) References Cited

U.S. PATENT DOCUMENTS 1,281,292 A * 10/1918 Chaffee ..................... F16F 1/24 267/50
2,028,299 A 1/1936 Swinton
(Continued)

FOREIGN PATENT DOCUMENTS

AT 12101 U1 * 8/2011 .............. F16F 1/024
BR PI0503283-0 A 1/2006
(Continued)

OTHER PUBLICATIONS

International Search Report & Written Opinion to corresponding PCT Application No. PCT/BR2020/050088 dated Apr. 30, 2020.

*Primary Examiner* — Melody M Burch
(74) *Attorney, Agent, or Firm* — Dinsmore & Shohl LLP

(57) ABSTRACT

The anti-noise element is applied to separate the end portions of each two spring blades, superimposed and adjacent, of a spring bundle and comprises a metal plate covered by a coating in polyamide-11 thermoplastic resin and incorporating a median protrusion to be fitted and retained into a corresponding hole provided at the end portion of the spring blade against which the anti-noise element is seated and retained.

13 Claims, 4 Drawing Sheets

(52) U.S. Cl.
CPC ..................... *B60G 2202/11* (2013.01); *B60G 2206/71043* (2013.01); *B60G 2206/722* (2013.01); *B60G 2600/44* (2013.01); *F16F 2224/02* (2013.01); *F16F 2224/0208* (2013.01); *F16F 2230/02* (2013.01)

(56) References Cited

U.S. PATENT DOCUMENTS

| | | | | |
|---|---|---|---|---|
| 2,621,922 | A | 12/1952 | Watson | |
| 2,735,672 | A * | 2/1956 | Bradley | F16F 1/20 267/49 |
| 2003/0222387 | A1 * | 12/2003 | Yokoyama | F16F 1/182 267/260 |
| 2014/0312543 | A1 | 10/2014 | Nakagawa et al. | |

FOREIGN PATENT DOCUMENTS

| | | | | |
|---|---|---|---|---|
| BR | PI0711619-5 | A2 | 12/2011 | |
| CN | 200975432 | Y | 11/2007 | |
| CN | 203570900 | U | 4/2014 | |
| CN | 205292175 | U | 6/2016 | |
| DE | 2421224 | A * | 11/1975 | F16C 33/201 |
| GB | 1314217 | A | 4/1973 | |
| JP | 3528648 | B2 * | 5/2004 | |
| JP | 2013167269 | A | 8/2013 | |
| KR | 0137440 | Y1 * | 3/1999 | |
| KR | 100726508 | B1 | 6/2007 | |
| KR | 20180043482 | A * | 4/2018 | |

* cited by examiner

NOISE-REDUCING ELEMENT FOR A LEAF SPRING

CROSS-REFERENCE TO RELATED APPLICATIONS

The present application is the National Phase entry of International Patent Application No. PCT/BR2020/050088 filed Mar. 13, 2020, which claims priority to Brazilian Patent Application No BR 2020190049796 filed Mar. 14, 2019, the contents of which are hereby incorporated by reference.

TECHNICAL FIELD

The present disclosure refers, to an element to be positioned between the blades of a spring bundle usually applied in the suspension of vehicles and road implements, usually cargo or passenger transport vehicles, to reduce or even eliminate noise caused by the frictional movement between adjacent spring blades of the spring bundle, when the suspension is working during the running of the vehicle.

BACKGROUND

Spring bundles applied to road vehicles are known in the state of the art and comprises each one an assembly of spring blades with equal or distinct lengths, mounted superimposed to each other, to flex together, by reacting to the loads that are imposed on them.

These wide-use spring bundles of spring blades present the inconvenience of producing loud and unpleasant noises when the frictional movement of the adjacent spring blades of each bundle, when they are flexed under the different loads imposed on them by the vehicle in movement. This inconvenience is particularly unpleasant for the vehicle passengers.

According to one of the well-known constructive solutions for these noise eliminating elements, each element being formed by a plate or blade having a usually rectangular and/or circular contour, formed in polymeric material and or composite rubber, with or without reinforcement additives in its composition, and presenting a width adjusted to the width of the blades of the spring bundle and an extension, in the longitudinal direction of the bundle, only sufficient to prevent direct contact between the end portions of each two adjacent spring blades of the spring bundle. Each element incorporates at least one protrusion, to be fitted into a corresponding hole, provided in the adjacent spring blade of each pair of blades to be separated by the anti-noise element, to ensure the correct positioning of the element in the spring bundle.

These elements with anti-noise function, formed in polymeric material and/or composite rubber, have limited service life, since said material drains or wears out due to the workload and/or friction to which they are subjected, until their operational failure occurs, which may cause the release of the anti-noise element of the spring bundle or its displacement between the two blades, towards the central region of the spring blades, which may cause premature fracture of blades of the spring bundles. The anti-noise element loses its function in both of the above mentioned failures.

In another known construction for the anti-noise element, each one is formed by a metal plate or sheet that incorporates, on its upper face, by bonding, vulcanization or other suitable techniques, a layer of composite rubber and, in its lower face, at least one lower positioning protrusion, also generally metallic, for example a stud, and to be fitted and locked into a corresponding hole provided in the lower spring blade of each pair of blades to be separated by the anti-noise element. This composite element also has a width adjusted to the width of the blades of the spring bundles and a longitudinal extension just enough to prevent direct contact between the end portions of each two adjacent spring blades of the spring bundle.

These elements, formed in metal sheet and carrying a rubber pad, also have limited useful life due to wear out by friction and the workload to which the rubber pad is submitted. In addition, these elements with rubber pads are retained in the spring bundles, usually by studs and nuts, requiring a longer production time and increasing the costs of the product in relation to the polymeric anti-noise element.

Another known construction is disclosed in patent document PI 0503283-0. In this case, each anti-noise element comprises a rectangular steel blade, of reduced thickness and having width and length corresponding to those of the two adjacent blades of the spring bundles, between which the element will be mounted. Each anti-noise element has at least its end portions coated, superiorly and inferiorly, with a layer of elastomeric material which is defined by vulcanized rubber, but which can be formed from various synthetic or natural materials. This anti-noise element can be in the form of a smooth metallic blade, being kept in position in the spring bundle, by the usual pin or central rod that passes through all the blades and also by the usual retaining clamps provided in the spring bundle. Furthermore, the steel blade element can include, on one face, drawn protrusions in the form of ribs and, on the opposite face, corresponding recesses.

This previous construction, besides presenting the same deficiencies of the solution that uses a metal sheet carrying a rubber pad, suggests the use of steel blades that extend throughout the entire length of the pair of spring blades in which it is mounted, substantially increasing the construction costs of the spring bundle and increasing unnecessarily its final weight.

SUMMARY

Due to the deficiencies of the known solutions, as commented above, the present disclosure aims to provide an anti-noise element of simple construction, relatively low cost, presenting easy and safe assembly in a bundle of laminar springs and presenting an increased service life compared to known construction solutions.

BRIEF DESCRIPTION OF THE DRAWINGS

The present anti-noise element will be described below, referring to the attached drawings, in which.

DETAILED DESCRIPTION

As already previously mentioned and illustrated in the attached drawings, the present anti-noise element EAR is positioned between the end portions 13, 15 of each two spring blades LM of a spring bundle FM that is usually applied in the suspension of vehicles and road implements and formed by an assembly of spring blades LM. In the illustrated configuration, the spring blades LM have different lengths, although it is possible to use spring blades LM with the same length to form a spring bundle FM. The spring blades LM are mounted superimposed each other, with or without the provision of retaining elements ER of aligning function known in the art.

It should be understood that the term spring blade defines not only a spring blade operating as a suspension spring, but also an eventual safety spring blade, arranged in the lower region of the spring bundle and which does not operate as suspension spring rather as an additional safety element in the event of a break of the spring bundle, which safety element may comprise one or multiple suspension spring blades.

According to the present disclosure, each anti-noise element EAR comprises a metallic plate 10, in steel or any suitable alloy, of variable contour, polygonal, circular or elliptical, with maximum width adjusted to the total width of the spring bundle FM, provided or not with its retaining elements ER, and having an extension, in the length direction, approximately equal to its width and sufficient to prevent direct contact between the superposed end portions 13, 15 of two adjacent spring blades LM.

In the two illustrated embodiments, each metal plate 10 has a thickness smaller than the thickness of the spring blades LM, generally smaller than half the thickness of the adjacent spring blades LM, each metal plate 10 being covered with a coating 20 in the form of a layer of thermoplastic resin known as polyamide-11, with the thickness of the coating 20 ranging from 0.01 mm to 2.00 mm, as a function of the dimensional characteristics of the spring blades LM of the spring bundle FM in which the anti-noise element EAR will be applied.

Figure 2:
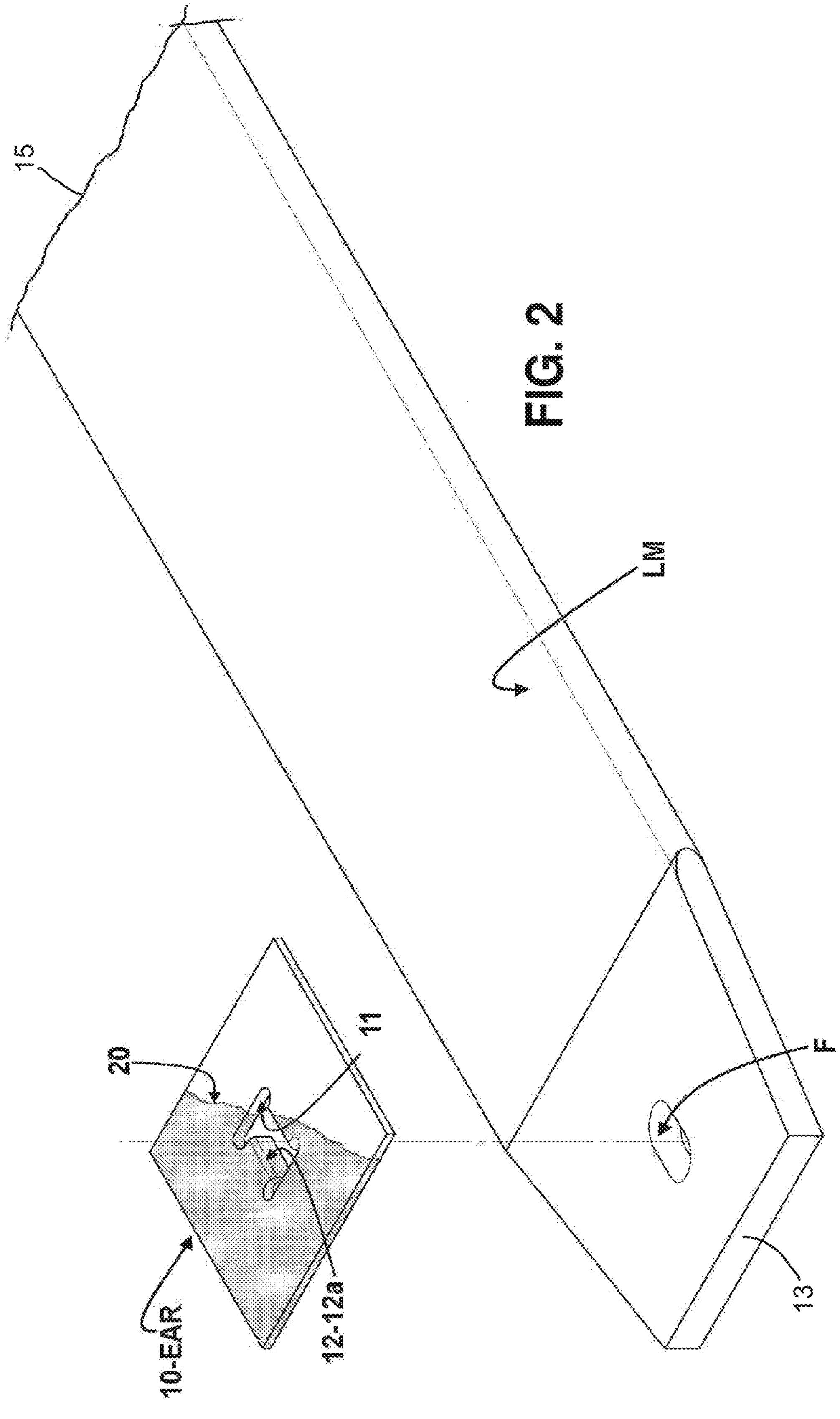
FIG. 2 represents an isometric and exploded perspective view, illustrating an end portion of a spring blade and the corresponding anti-noise element, according to a first embodiment and to be seated and retained on said spring blade.

The coating 20 is defined by the application, by immersion or any other suitable process, of the thermoplastic resin defined by polyamide-11, allowing to obtain an anti-noise element that can be used in any type of spring bundle FM, being of easy construction and assembly, with competitive cost and presenting superior durability when compared to that of currently known solutions. The coating 20 is partially illustrated on the anti-noise element EAR (see FIGS. 2, 3 and 5).

Figure 3:
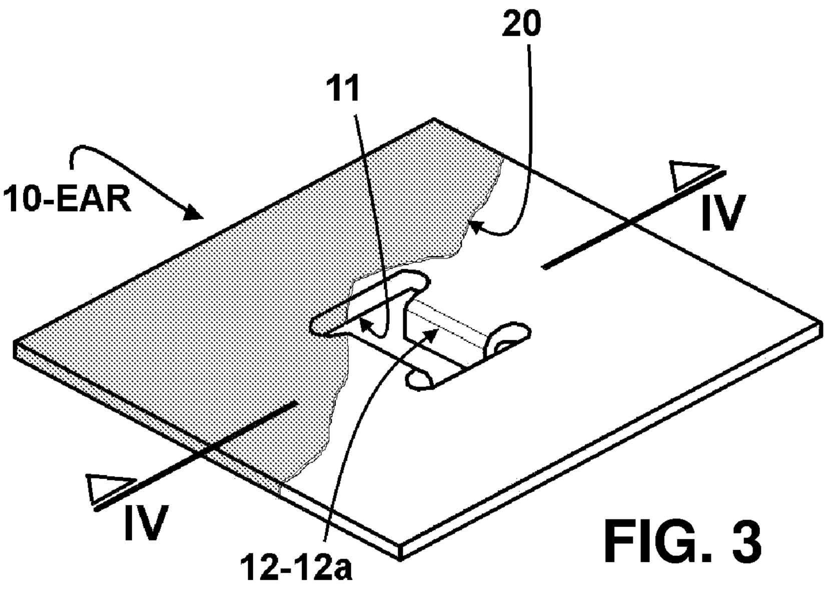
FIG. 3 represents an isometric perspective view of the anti-noise element, according to its first embodiment shown in FIG. 2.
Figure 4:
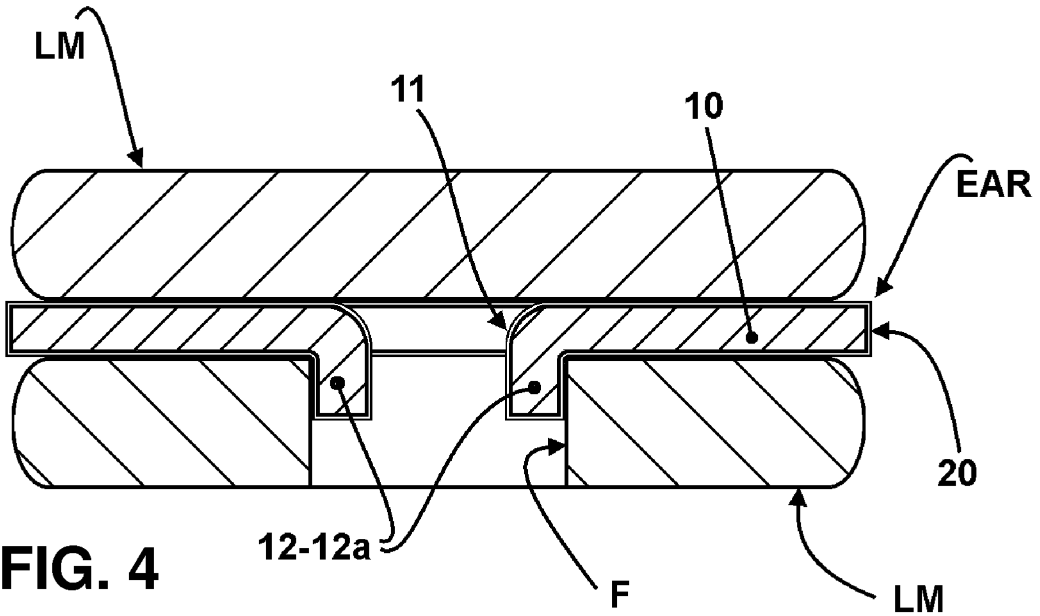
FIG. 4 represents a cross-sectional view of the anti-noise element, which view is taken according to the line IV-IV in FIG. 3 and showing the element mounted between two adjacent spring blades which are shown in cross-section.

As illustrated in FIGS. 3 and 4, the anti-noise element EAR can be defined, in a first embodiment, by a metal plate 10, with the dimensions of width, length and thickness as defined above and incorporating a median protrusion 12 that, in the illustrated constructions, is defined by a median drawn 11, said median protrusion 12 being designed to be fitted and retained, against displacements, into a corresponding hole F provided in the end portion 13, 15 of the spring blade LM against which the anti-noise element EAR is seated and retained.

In the example of FIGS. 3 and 4, the median drawn produces a median protrusion 12 defined by a pair of parallel ribs 12 a, spaced apart and arranged in the longitudinal direction of the spring bundle FM, to be fitted into the hole F of the end portion 13, 15 of a respective spring blade LM, ensuring the correct and safe positioning of the anti-noise element EAR in the spring bundle FM.

Figure 1:
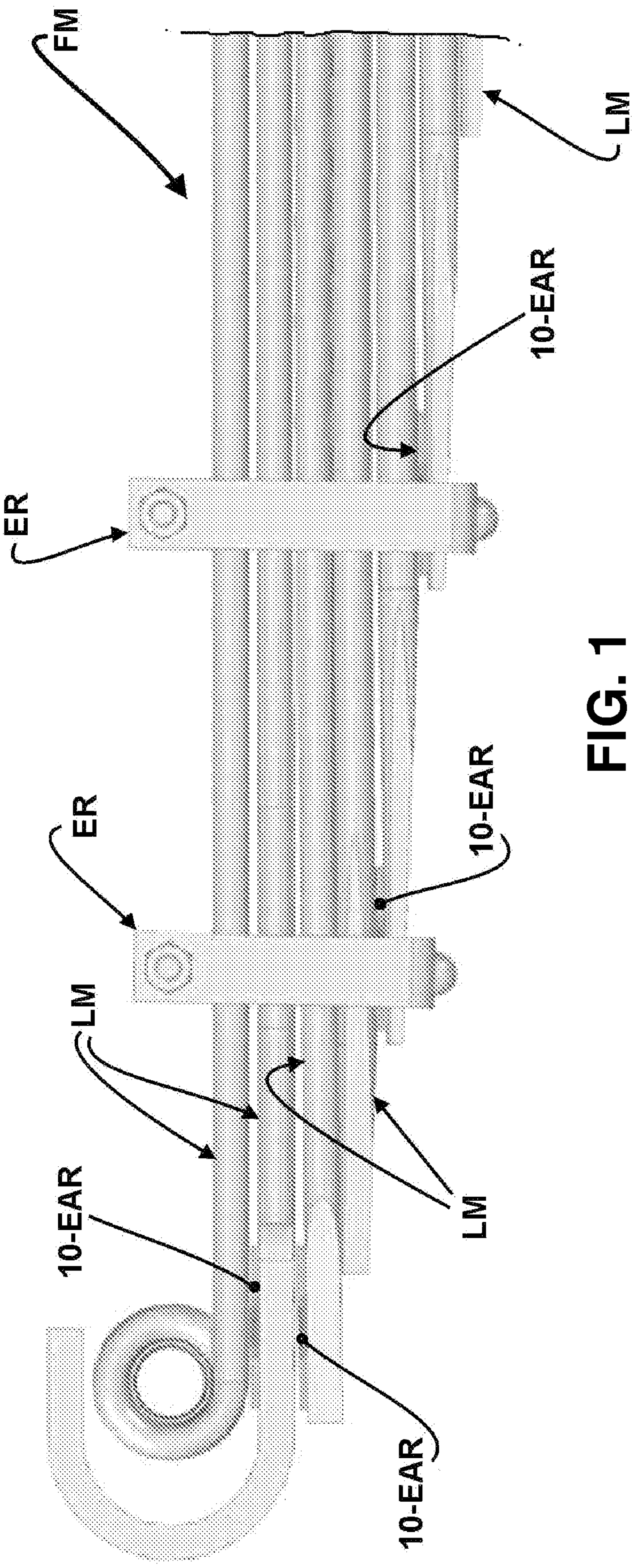
FIG. 1 represents a side elevational view of one of the end portions of a typical bundle of spring blades, provided with an anti-noise element according to the present disclosure and positioned between the ends of each two adjacent springs blades.
Figure 5:
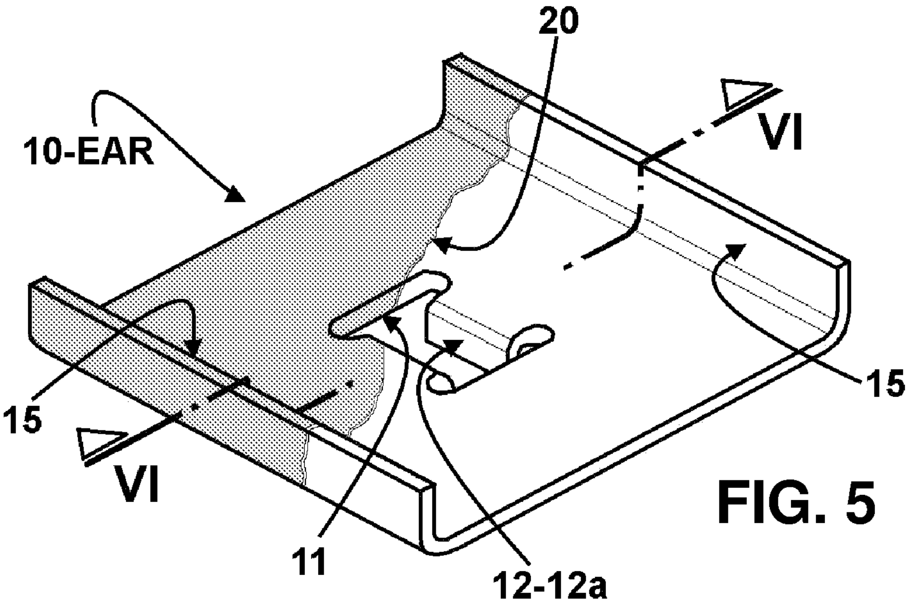
FIG. 5 represents an isometric perspective view of the anti-noise element constructed according to a second embodiment.
Figure 6:
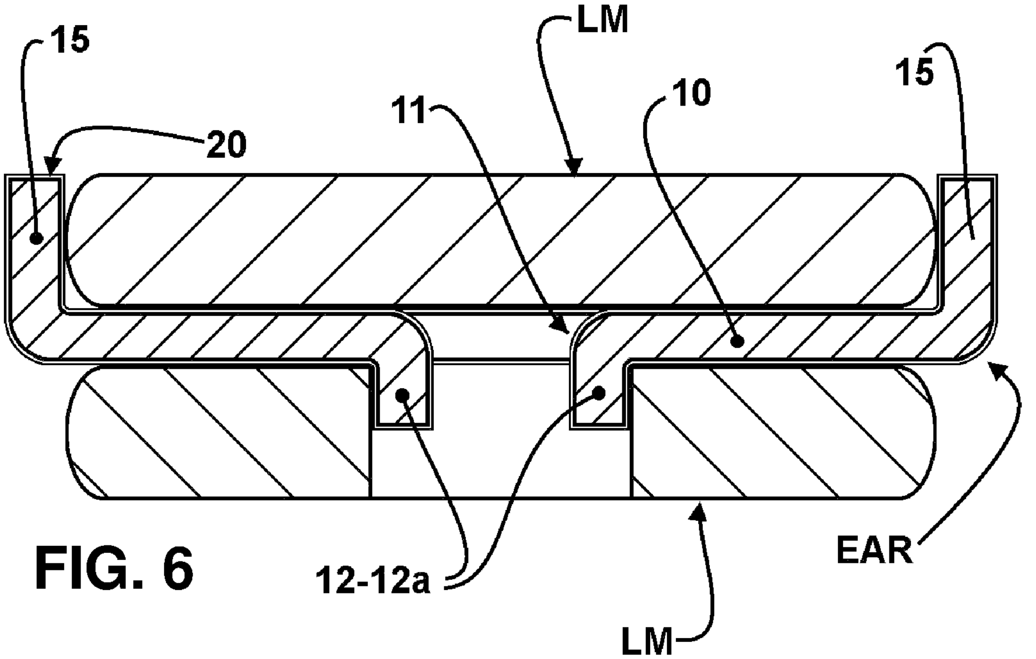
FIG. 6 represents a cross-sectional view of the anti-noise element in its second embodiment, the view being taken according to the line VI-VI in FIG. 5 and having the element mounted between two adjacent spring blades, which are shown in cross-section.

FIGS. 5 and 6 illustrate a second embodiment for the anti-noise element EAR, presenting the same characteristics as described above in relation to the first embodiment illustrated in FIGS. 3 and 4 and that receive the same reference numbers. However, in the second embodiment, the metal plate 10 incorporates, in each longitudinal edge, a side flap 15 to be seated against an adjacent side edge of a spring blade LM immediately adjacent, superiorly or inferiorly, in the spring bundle FM. In FIG. 6, it is illustrated only the seating of the side flaps 15 of the metal plate 10 against the side edge of the spring blade LM positioned immediately above. However, it should be understood that the metal plate 10 can be mounted in an inverted position relative to that illustrated in FIG. 6, with its side flaps 15 seated against the opposite side edges of a spring blade LM positioned immediately below. Thus, in the construction proposed herein, in which the metal plate 10 incorporates the side flaps 15, the retaining elements ER, illustrated in FIG. 1, can be totally or partially removed from the spring bundle FM.

In both the first and second embodiments, the entire metal plate 10, including the median protrusion 12 and eventual side flaps 15, is covered with the coating 20 in polyamide-11, avoiding any direct metallic contact between the anti-noise element itself and the two adjacent spring blades LM.

Although only two embodiments of the anti-noise element of the present disclosure have been presented herein, changes can be made to the shape and arrangement of the component parts of the element, without deviating from the proposed

The invention claimed is:

1. An anti-noise element for a spring bundle formed by an assembly of spring blades mounted superimposed with each other and having end portions of each two adjacent spring blades separated by a respective anti-noise element comprising a metal plate, with a width adjusted to a total width of the spring bundle and with a length preventing direct contact between the superimposed end portions of two adjacent spring blades, the metal plate incorporating a median protrusion defined by a median drawn in the metal plate defined by a pair of parallel ribs spaced apart from one another in a lateral direction, each rib of the pair of parallel ribs extending in a longitudinal direction of the spring bundle perpendicular to the lateral direction, the longitudinal direction of the spring bundle extending between opposite end portions of a respective spring blade, wherein the pair of parallel ribs are fitted into a corresponding hole provided in the end portion of the spring blade against which the anti-noise element is seated and retained, the entire metal plate including the median protrusion being covered with a coating in polyamide-11.

2. The anti-noise element, according to claim 1, wherein the coating is defined by a polyamide-11 resin layer, with a thickness from 0.01 mm to 2.00 mm.

3. The anti-noise element, according to claim 1, wherein the metal plate has a thickness smaller than a thickness of the spring blades.

4. The anti-noise element, according to claim 1, wherein the metal plate incorporates, at each longitudinal edge, a side flap to be seated against an adjacent side edge of the spring blade immediately adjacent in the spring bundle, each side flap being covered with the coating in polyamide-11.

5. The anti-noise element, according to claim 2, wherein the metal plate has a thickness smaller than a thickness of the spring blades.

6. The anti-noise element, according to claim 2, wherein the metal plate incorporates, at each longitudinal edge, a side flap to be seated against an adjacent side edge of the spring blade immediately adjacent in the spring bundle.

7. The anti-noise element, according to claim 3, wherein the metal plate incorporates, at each longitudinal edge, a side flap to be seated against an adjacent side edge of the spring blade immediately adjacent in the spring bundle.

8. The anti-noise element, according to claim 1, wherein the metal plate incorporates, at each longitudinal edge, a side flap to be seated against an adjacent side edge of the spring blade immediately adjacent in the spring bundle.

9. The anti-noise element, according to claim 6, wherein the entire metal plate, including the median protrusion and side flaps, is covered with the coating in polyamide-11.

10. The anti-noise element, according to claim 7, wherein the entire metal plate, including the median protrusion and side flaps, is covered with the coating in polyamide-11.

11. The anti-noise element, according to claim 8, wherein the entire metal plate, including the median protrusion and side flaps, is covered with the coating in polyamide-11.

12. The anti-noise element, according to claim 1, wherein the metal plate incorporates, at each longitudinal edge, a side flap to be seated against an adjacent side edge of the spring blade immediately adjacent in the spring bundle, the side flaps extending parallel to the pair of parallel ribs.

13. The anti-noise element, according to claim 1, wherein a width of each rib extending in the lateral direction is less than a length of each rib extending in the longitudinal direction.

* * * * *